US010803613B2

(12) United States Patent
Porter et al.

(10) Patent No.: US 10,803,613 B2
(45) Date of Patent: Oct. 13, 2020

(54) COMPUTER VISION SYSTEMS AND METHODS FOR GROUND SURFACE CONDITION DETECTION AND EXTRACTION FROM DIGITAL IMAGES

(71) Applicant: Geomni, Inc., Jersey City, NJ (US)

(72) Inventors: Bryce Zachary Porter, Lehi, UT (US); Cory Shelton, Cedar Hills, UT (US); Josh Barker, Eagle Mountain, UT (US)

(73) Assignee: Geomni, Inc., Jersey City, NJ (US)

( * ) Notice: Subject to any disclaimer, the term of this patent is extended or adjusted under 35 U.S.C. 154(b) by 0 days.

(21) Appl. No.: 16/582,565

(22) Filed: Sep. 25, 2019

(65) Prior Publication Data

US 2020/0098130 A1 Mar. 26, 2020

Related U.S. Application Data

(60) Provisional application No. 62/736,003, filed on Sep. 25, 2018.

(51) Int. Cl.
*G06T 7/70* (2017.01)
*G06T 5/50* (2006.01)
(Continued)

(52) U.S. Cl.
CPC .............. *G06T 7/70* (2017.01); *G06T 3/4046* (2013.01); *G06T 5/50* (2013.01); *G06T 7/62* (2017.01);
(Continued)

(58) Field of Classification Search
CPC ............... G06F 30/13; G06K 9/00201; G06K 9/00637; G06K 9/3233; G06K 9/4604;
(Continued)

(56) References Cited

U.S. PATENT DOCUMENTS

2012/0113225 A1 5/2012 Deppermann et al.
2013/0329940 A1 12/2013 Nakamura
(Continued)

OTHER PUBLICATIONS

Eisenbeiss, "UAV Photogrammetry," Dissertation submitted to ETH Zurich (2009) retrieved on Nov. 14, 2019 https://www.research-collection.ethz.ch/handle/20.500.11850/20976> (98 pages).
(Continued)

*Primary Examiner* — Kim Y Vu
*Assistant Examiner* — Michael J Vanchy, Jr.
(74) *Attorney, Agent, or Firm* — McCarter & English, LLP

(57) ABSTRACT

A system for detecting and extracting a ground surface condition from an image comprising a memory and a processor in communication with the memory. The processor performs a high resolution scan of at least one input image and generates an orthomosaic model and a digital surface model based on the performed high resolution scan. The processor generates an image tile based on the generated models and determines a label indicative of a probability of a presence of a ground surface condition for each pixel of the generated image tile via a computer vision model. The processor generates a label tensor for the at least one input image based on the determined labels and extracts a two-dimensional geospatial representation of a detected ground surface condition based on the generated label tensor. The processor generates a report indicative of damage associated with the detected ground surface condition based on the extracted two-dimensional geospatial representation.

18 Claims, 18 Drawing Sheets

(51) Int. Cl.
*G06T 3/40* (2006.01)
*G06T 7/62* (2017.01)

(52) U.S. Cl.
CPC ............... *G06T 2207/10032* (2013.01); *G06T 2207/20084* (2013.01); *G06T 2207/20221* (2013.01)

(58) Field of Classification Search
CPC .. G06K 9/4633; G06K 9/4652; G06K 9/6271; G06N 3/08; G06T 11/00; G06T 15/10; G06T 17/05; G06T 17/10; G06T 3/4038; G06T 7/60; G06T 7/80; G06T 2207/10032; G06T 2207/20084; G06T 2207/20221; G06T 3/4046; G06T 5/50; G06T 7/62; G06T 7/70
See application file for complete search history.

(56) References Cited

U.S. PATENT DOCUMENTS

2017/0076438 A1* 3/2017 Kottenstette ....... G06K 9/00637
2017/0206648 A1* 7/2017 Marra .................. B64C 39/024
2017/0282869 A1 10/2017 Tong et al.

OTHER PUBLICATIONS

International Search Report of the International Searching Authority dated Dec. 10, 2019, issued in connection with International Application No. PCT/US2019/052929 (3 pages).
Written Opinion of the International Searching Authority dated Dec. 10, 2019, issued in connection with International Application No. PCT/US2019/052929 (5 pages).
Alcantarilla, et al., " KAZE Features," in European Conference on Computer Vision (ECCV), Fiorenze, Italy, Oct. 2012 (14 pages).
Ullman, S., "The Interpretation of Structure from Motion, " Proceedings of the Royal Society of London, (1979) B-203, pp. 405-426 (22 pages).

* cited by examiner

123 Example St. Lohi UT 84043 1146390

Overview

Damage Summary

| Area | % |
|---|---|
| 1,532.78 (Sq ft) | 15.33 |

Cracks

| Area (Sq ft) | 1,532.78 |
|---|---|
| % | 15.33 |

Utility Cut Depressions

| Area (Sq ft) | 1,609.42 | 1,640.07 | 1,686.06 | 1,762.70 | 1,793.35 | 1,839.34 | 1,869.99 |
|---|---|---|---|---|---|---|---|
| % | 16.09 | 16.40 | 16.86 | 17.63 | 17.93 | 18.39 | 18.70 |

| 1,915.98 |
|---|
| 19.16 |

1/16/2018

COMPUTER VISION SYSTEMS AND METHODS FOR GROUND SURFACE CONDITION DETECTION AND EXTRACTION FROM DIGITAL IMAGES

RELATED APPLICATIONS

This application claims priority to U.S. Provisional Patent Application Ser. No. 62/736,003 filed on Sep. 25, 2018, the entire disclosure of which is hereby expressly incorporated by reference.

BACKGROUND

Technical Field

The present disclosure relates generally to the field of computer modeling of structures and property. More specifically, the present disclosure relates to computer vision systems and methods for ground surface condition detection and extraction from digital images.

Related Art

Accurate and rapid identification and depiction of objects from digital images (e.g., aerial images, satellite images, ground-based images, etc.) is increasingly important for a variety of applications. For example, information related to damage anomalies, obstructions and other characteristics of structures from images, such as, for example, ground surfaces, is often used by construction professionals to specify materials and associated costs for fixing, replacing and upgrading the structures. Further, in the insurance industry, accurate information about structures may be used to determine the proper costs for insuring buildings/structures. Still further, government entities can use information about the structures to determine the extent of the damage and schedule repairs.

Various software systems have been implemented to process aerial images. However, these systems may have drawbacks, such as an inability to accurately detect damage and anomalies. This may result in an inaccurate or an incomplete analysis. As such, the ability to generate an accurate and complete damage report is a powerful tool. Accordingly, the computer vision systems and methods disclosed herein solve these and other needs by providing methods to detect and extract structure conditions.

SUMMARY

This present disclosure relates to computer vision systems and methods for ground surface condition detection and extraction from digital images. The digital images can include, but are not limited to, aerial imagery, satellite imagery, ground-based imagery, imagery taken from unmanned aerial vehicles (UAVs), mobile device imagery, etc. The disclosed system can perform a high resolution scan and generate an orthomosaic and a digital surface model from the scans. The system can then perform damage detection and a geometric extraction. Finally, the system can generate a damage report.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present disclosure relates to computer vision systems and methods for ground surface condition detection and extraction from digital images, as described in detail below in connection with FIGS. 1-19.

The discussion below will be related to detecting damage, anomalies, obstruction, and other characteristic of ground surfaces from digital images. Image sources can include aerial imagery, such as from fixed wing aircraft, satellite imagery, ground-based imagery, imagery taken from unmanned aerial vehicles (UAVs), mobile device imagery, other sensor devices, etc. The damage detection can include, but is not limited to, cracking, distortion, disintegration, polished aggregate, bleeding or flushing, and utility cut depression. It should be understood that any reference to the ground surfaces is only by way of example and that the systems, methods and embodiments discussed throughout this disclosure may be applied to any surface, including but not limited to, parking lots, roadways, driveways, and other surfaces.

Figure 1:
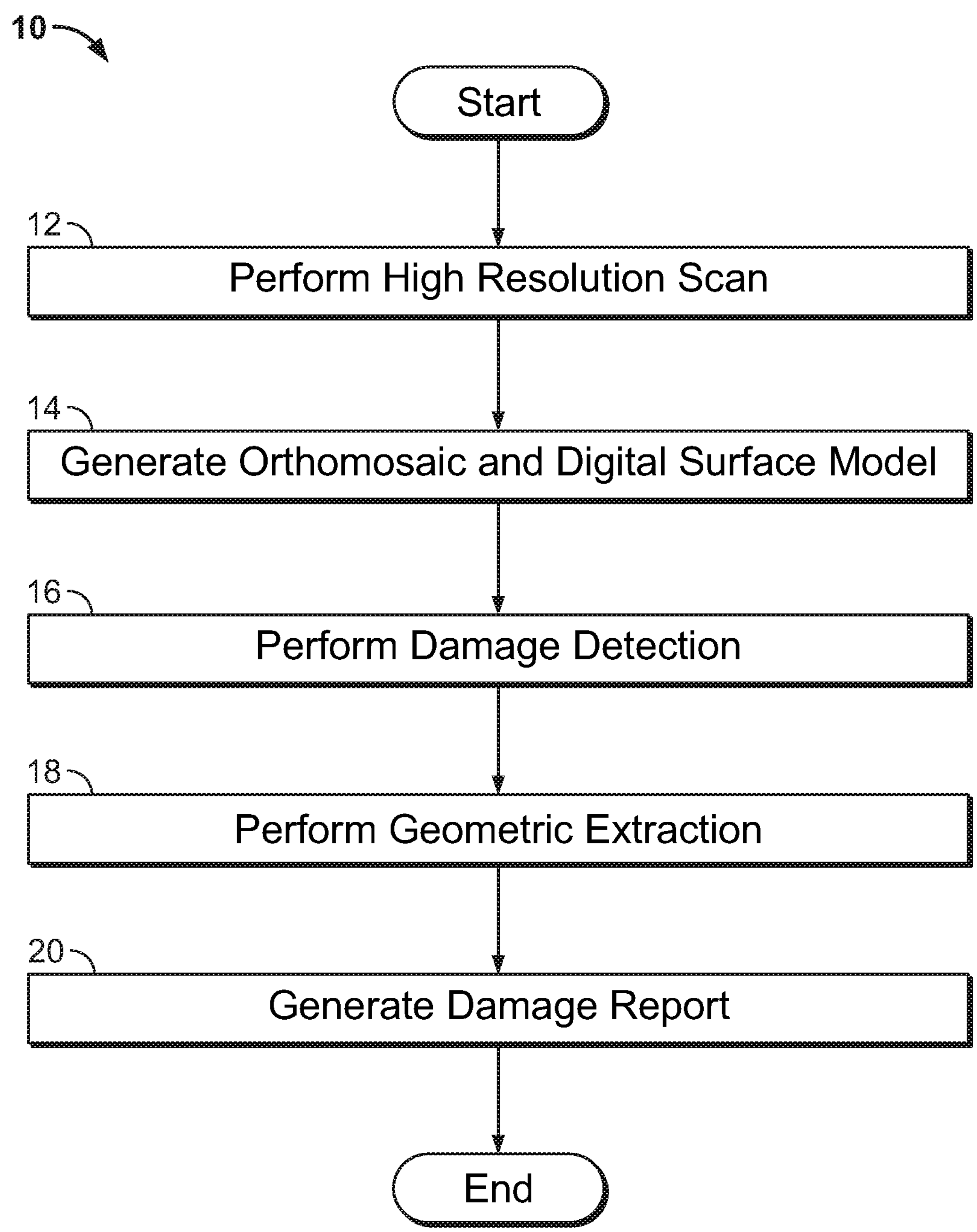
FIG. 1 is a flowchart illustrating overall process steps carried out by the system of the present disclosure.

FIG. 1 is a flowchart illustrating the overall process steps being carried out by the system, indicated generally at method 10. In step 12, the system 10 performs a high resolution scan. In a first example, the system retrieves one or more images and metadata of the retrieved images based on a geospatial region of interest ("ROI"). In a second example, the hi-resolution scan stage collects imagery at sub-inch ground sample distance ("GSD"). In step 14, the system 10 generates an orthomosaic and digital surface model ("DSM"). The orthomosaic and DSM can be a stitched image from the images retrieved in the high resolution scan. In step 16, the system 10 performs damage detection. Specifically, the system creates tensors that identify where damage is in pixel space. In step 18, the system 10 performs a geometric extraction. Specifically, the system transforms the pixel-space representation of damage into 2D geometry in world coordinates (e.g. vector data). In step 20, the system 10 generates a damage report. The damage report can include a summary of damages with representative visual sample of the damages. Each step of FIG. 1 will be described in greater detail below.

Figure 2:
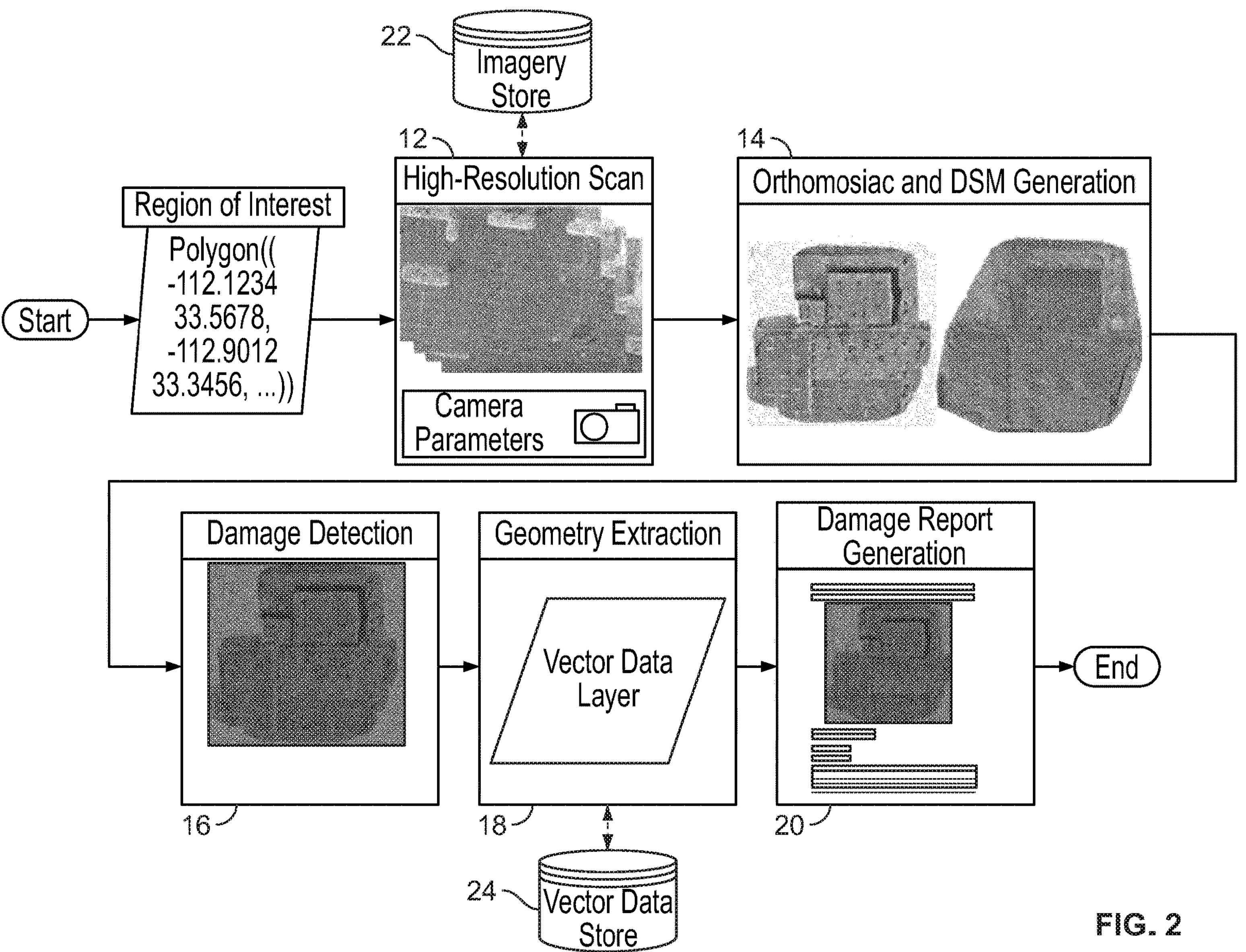
FIG. 2 is a diagram illustrating the overall process steps of FIG. 1 in greater detail.

FIG. 2 illustrates the method 10 in greater detail. As shown in FIG. 2, the high resolution scan 12 can also receive data from an imagery storage 22 and the geometric extraction 18 can also receive vector data from a vector data storage 24. Vector data is used to represent real world features with attributes that are described with either text or numeric values. A vector feature can be anything from houses, trees, pools, roads, cracks in pavement, etc. The shape of a vector feature can be captured using a geometric representation. The geometric representation can include, but is not limited to, a polygon, line segment, polyline, or point. The geometric representations are formed by one or more vertices that describe the vector features location in space. A ground surface damage vector feature is processed in pixel-space. The geometry is all vector data, but depending on the feature and the intended use the extracted data might be a polygon outline of the damage, a bounding region around the damage, individual line segments which make up the damage, or any other suitable geometric object. A collection of vector features can be referred to as a vector data layer.

It should be understood that FIG. 1 is only one potential configuration, and the system of the present disclosure can be implemented using a number of different configurations. The process steps of the invention disclosed herein could be embodied as computer-readable software code executed by one or more computer systems, and could be programmed using any suitable programming languages including, but not limited to, C, C++, C#, Java, Python or any other suitable language. Additionally, the computer system(s) on which the present disclosure may be embodied includes, but is not limited to, one or more personal computers, servers, mobile devices, cloud-based computing platforms, etc., each having one or more suitably powerful microprocessors and associated operating system(s) such as Linux, UNIX, Microsoft Windows, MacOS, etc. Still further, the invention could be embodied as a customized hardware component such as a field-programmable gate array ("FPGA"), application-specific integrated circuit ("ASIC"), embedded system, or other customized hardware component without departing from the spirit or scope of the present disclosure.

Figure 3:
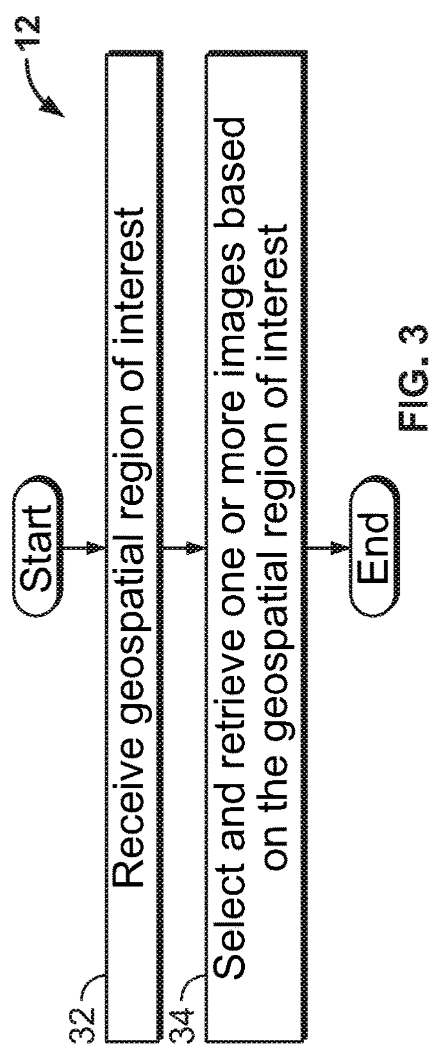
FIG. 3 is a flowchart illustrating step 12 of FIG. 1 in greater detail.

FIG. 3 shows a flowchart illustrating step 12 of FIG. 1 in greater detail. In particular, FIG. 3 illustrates process steps performed during the high resolution scan. In step 32, the system receives a geospatial region of interest ("ROI"). For example, a user inputs an address, a geocode, a polygon in world coordinates, latitude and longitude coordinates of a region, etc. The geospatial ROI can be represented as a polygon bounded by latitude and longitude coordinates. In a first example, the bound can be a rectangle or any other shape centered on a postal address. In a second example, the bound can be determined from survey data of property parcel boundaries. In a third example, the bound can be determined from a selection of the user (e.g., in a geospatial mapping interface). Those skilled in the art would understand that other methods can be used to determine the bound of the polygon. The ROI may be represented in any computer format, such as, for example, well-known text ("WKT") data, TeX data, Lamport TeX ("LaTeX") data, HTML data, XML data, etc. The geospatial ROI describes a world location where ground surface damage identification is to be performed.

In step 34, the system selects and retrieve one or more images based on the geospatial ROI. For example, after the user selects the geospatial ROI, one or more images associated with the geospatial ROI are selected and retrieved from a database (e.g., the imagery storage 22). As mentioned above, the images can be digital images such as aerial images, satellite images, ground based images, etc. However, those skilled in the art would understand that any type of images (e.g., photograph, scan, etc.) can be used. It should be understood that multiple images can overlap all or a portion of the geospatial ROI. A single image or multiple images can be selected depending on the size of the geospatial ROI and whether the system requires multiple images or whether the single image is sufficient.

Figure 4:
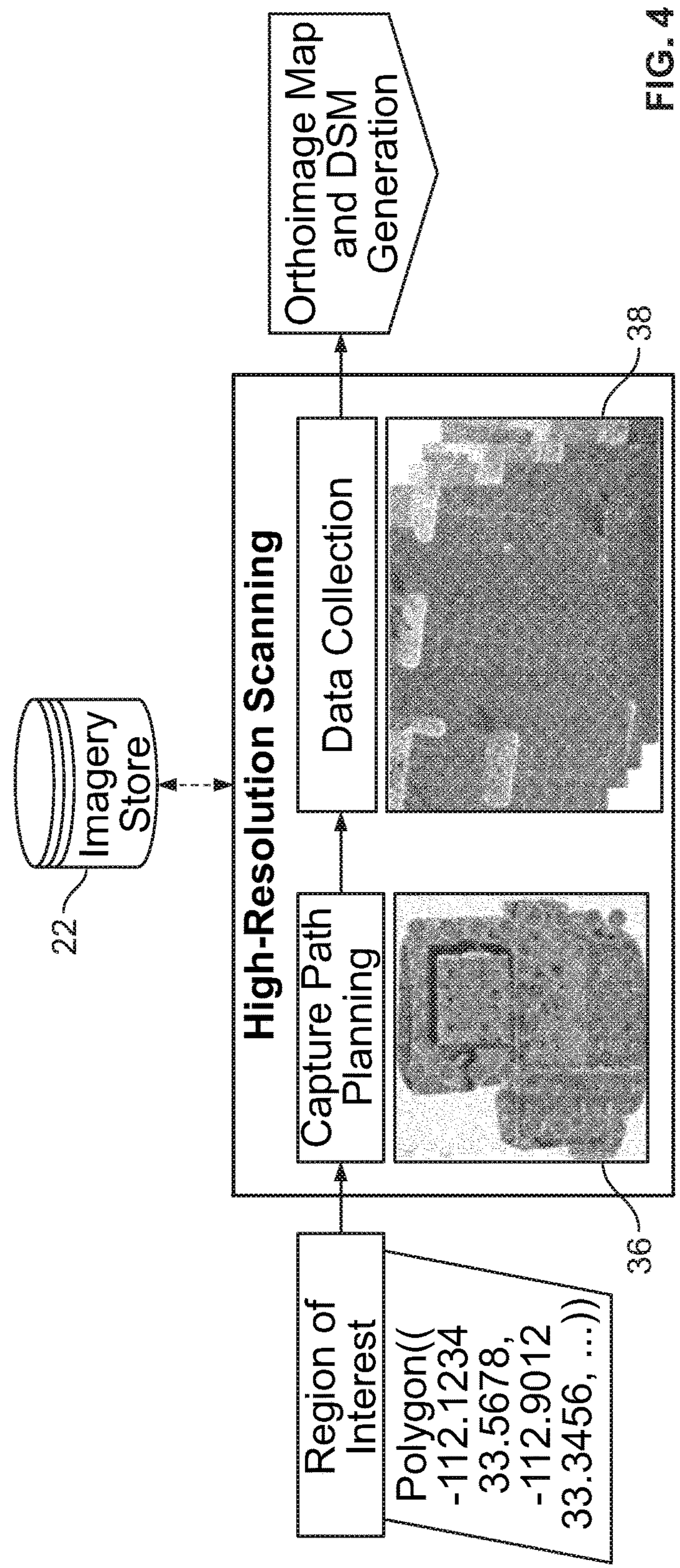
FIG. 4 is a diagram illustrating an image collection process.

If the images are not available or do not exist, the images can be captures for the selected geospatial ROI using a capable hardware system. For example, a UAV with an attached camera system can be used to scan the geospatial ROI. FIG. 4 is an illustration showing an image collection process when the images are not available or do not exist. First, the system plans a capture path 36 to ensure that imagery (e.g., high resolution images) is captured for an entire geospatial ROI. It should be noted that capture path planning 36 can be done manually using, for example, a UAV, or automatically using, for example, aerial or satellite imagery in combination with machine learning and algorithms for detecting obstacles that can be present in the region of interest. During the image collection process, it is desirable for the system to fully capture the geospatial ROI with overlap such that an orthomosaic and DSM can be created from the data captured while avoiding obstacles that can be present in the geospatial ROI. The system then executes the capture path and performs data collection 38. For example, a person can be at the geospatial ROI and to pilot a UAV or other hardware system. Alternatively, the UAV can be piloted remotely from a remote location. The collected data can be stored in the imagery storage 22.

Figure 5:
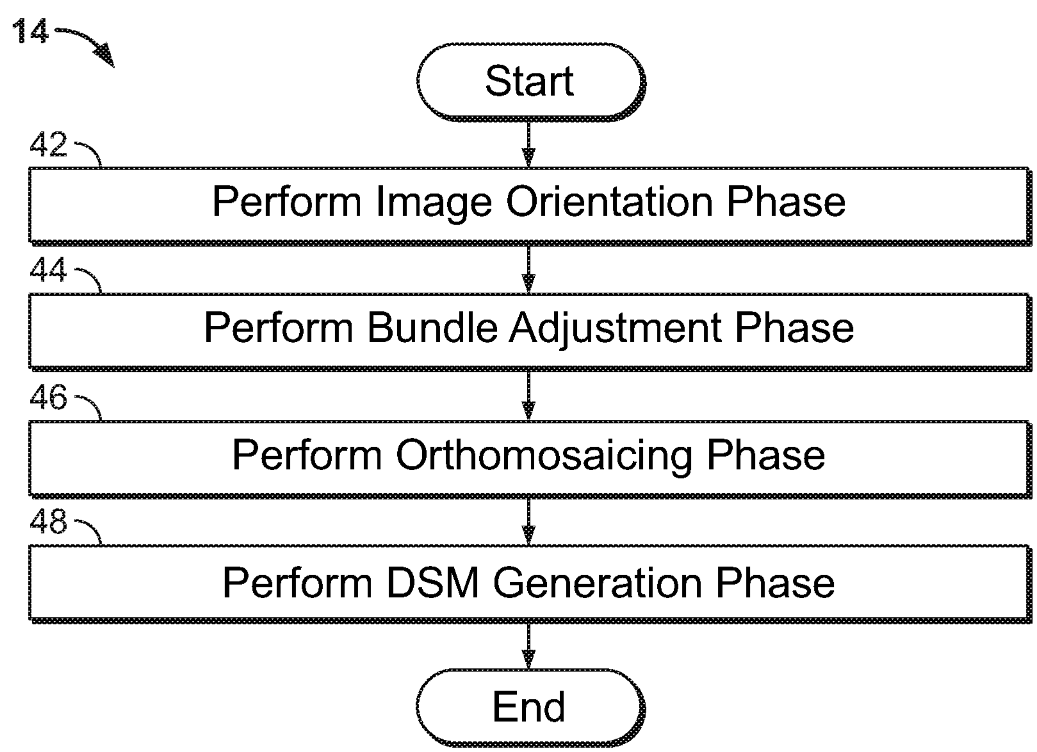
FIG. 5 is a flowchart illustrating step 14 of FIG. 1 in greater detail.

FIG. 5 shows a flowchart illustrating step 14 of FIG. 1 in greater detail. In particular, FIG. 5 illustrates process steps performed during the generating the orthomosaic and the DSM. The orthomosaic and the DSM remove overlap in the captured data and the DSM can be used to project pixel-space damage detection into a world coordinate space. Orthorectification is commonly used to correct geometrically distorted imagery such that undistorted measurements can be obtained. An orthomosaic map is a collection of orthorectified images that have some amount of overlap such that blocks of images can be stitched together to form a single map. An orthomosaic map is useful in this system so that damage can be measured directly on the imagery free from distortion. The orthomosaic map also reduces the number of pixels processed by the machine learning networks in the damage detection stage because images are stitched together and image overlap is removed.

Figure 6:
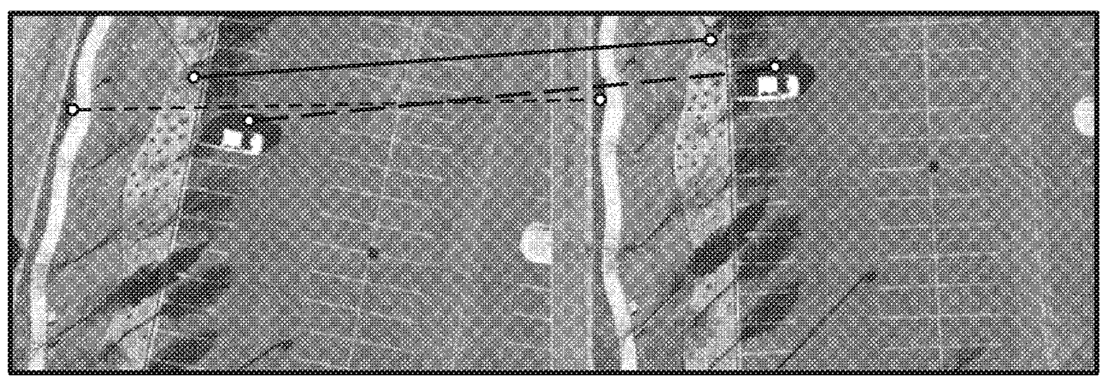
FIG. 6 is a diagram illustrating key points being matched between image pairs.

In step 42, the system performs an image orientation phase. The image orientation step determines a spatial position and an orientation of each camera relative to each other. For example, the system selects matching key points in each image pair by using a feature detector algorithm, such as, for example, KAZE. Those skilled in the art would understand that other methods for selecting matching key points or other feature detector algorithms can be used. FIG. 6 is an illustration showing an example of how key points are matched between image pairs.

Figure 7:
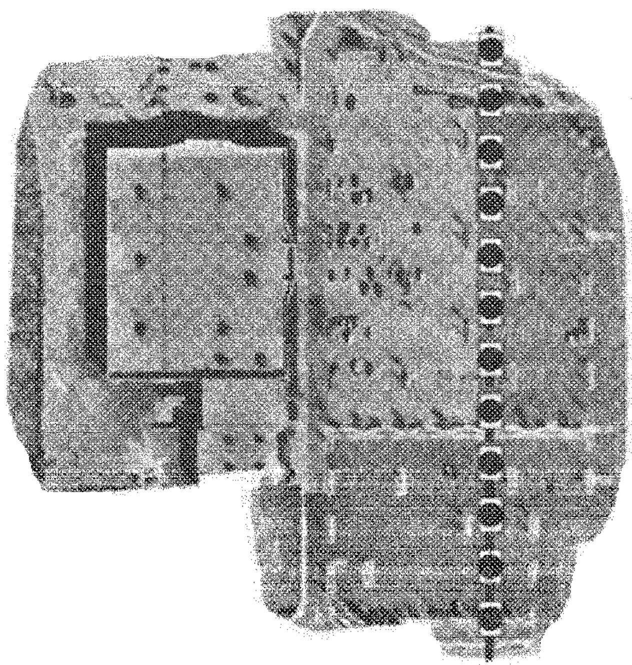
FIG. 7 is a diagram illustrating a bundle adjustment process for correcting the extrinsic camera parameters as a group to minimize the projection error.
Figure 7:
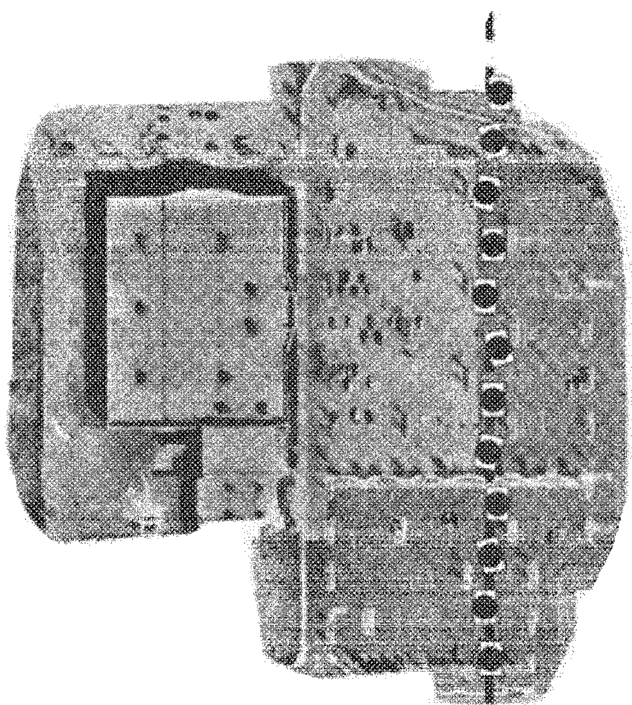

In step 44, the system performs a bundle adjustment phase to minimize an overall projection error caused from transforming a key point from one image to another image. The bundle adjustment phase minimizes the overall projection error by adjusting the camera parameters as a group. FIG. 7 is an illustration showing an example a bundle adjustment correcting the extrinsic camera parameters as a group to minimize the projection error. The collection of images are now oriented and correlated relative to each other and the collection of images have been adjusted to minimize error due to camera parameter inaccuracies.

Figure 8:
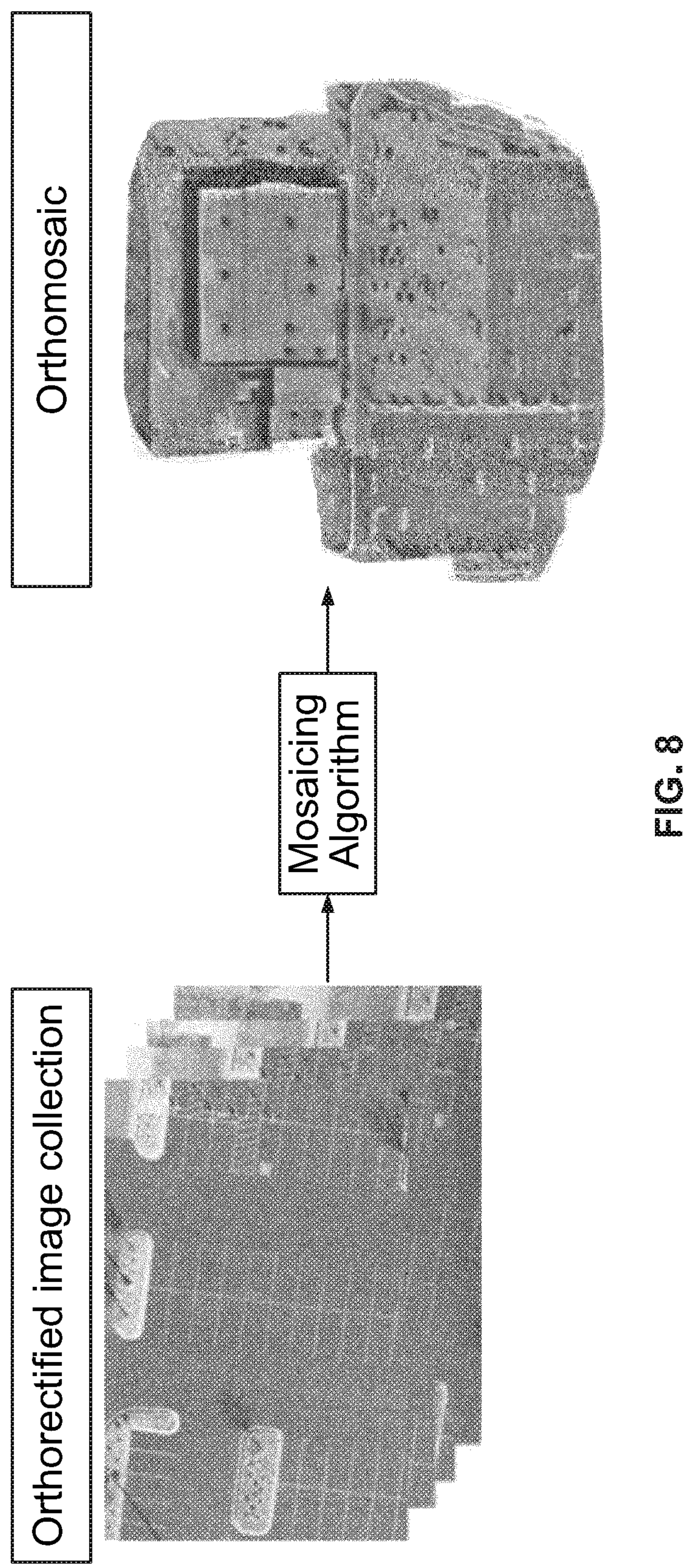
FIG. 8 is a diagram illustrating the input and output of a "mosaicing" generation process.

In step 46, the system performs an orthomosaic generation phase. Specifically, the system first uses the camera parameters to perform orthorectification. Again, orthorectification is a process which removes distortion caused by the sensor, the viewing perspective and terrain effects. Next, the system stitches the images together into a single image. For example, the system can use a stitching algorithm to stitch image the image collection into an orthomosaic. FIG. 8 is an illustration showing the input and output of the orthomosaic generation phase.

In step 48, the system performs the DSM generation phase. The DSM can be generated using, for example, a triangulation algorithm. Generating the digital surface model determines a point's 3D location when it is seen by a multiplicity of images. This is also commonly known as structure from motion.

Figure 9:
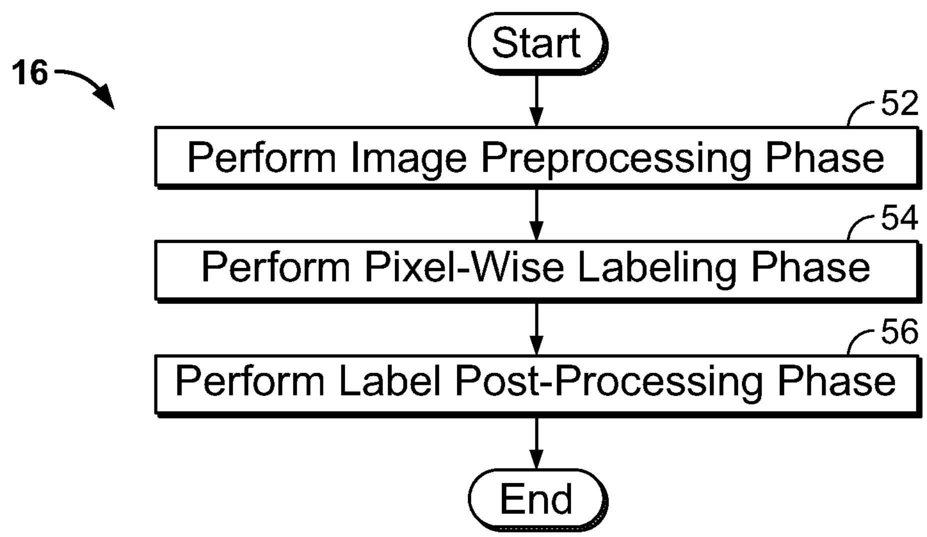
FIG. 9 is a flowchart illustrating step 16 of FIG. 1 in greater detail.
Figure 10:
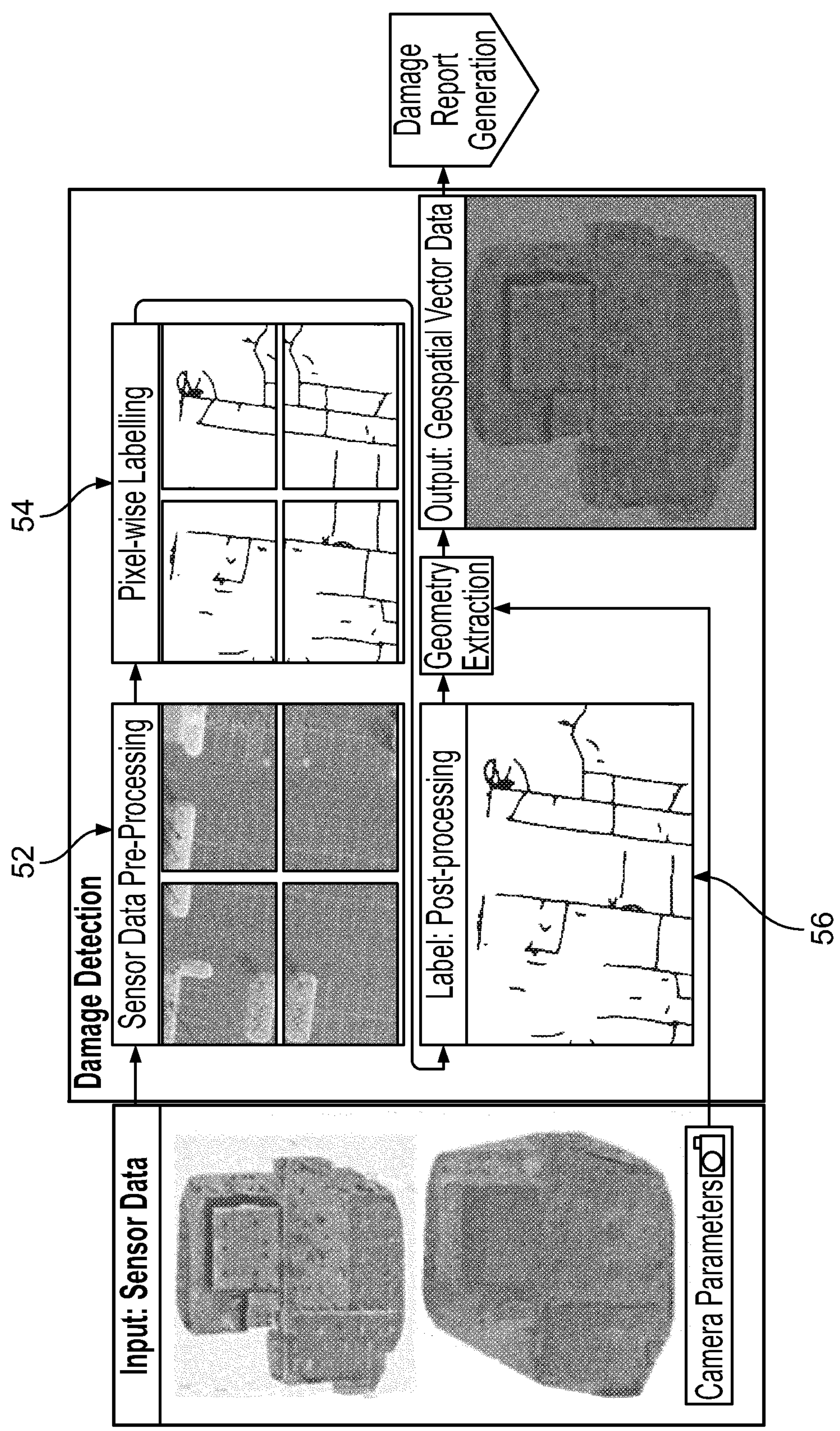
FIG. 10 is a diagram illustrating the overall process steps of FIG. 9 in greater detail.

FIG. 9 shows a flowchart illustrating step 16 of FIG. 1 in greater detail. In particular, FIG. 9 illustrates process steps performed during the damage detection. In step 52, the system performs an image pre-processing phase. The image pre-processing phase takes an image and prepares one or more uniformly-shaped image tiles. In step 54, the system performs a pixel-wise labeling phase. The pixel-wise labeling phase produces label tiles corresponding to the image tiles. In step 56, the system performs a label post-processing phase. The label post-processing phase combines the label tiles into one labeling (a label tensor) for the whole image. FIG. 10 is an illustration showing the steps of FIG. 9. Each step of FIG. 9 will be explained in more detail below.

It should be noted that images and image tiles as can be though of as tensors. Specifically, an image is a tensor that has a shape ($h \times w \times c$) where h and w are a spatial height and width of an image and c is a channel dimension of each pixel. For example, color images can include red, blue, and green component color channels. The height, width, and number of channels varies from image to image. Image tiles are tensors derived from an image and have a uniform height, width, and number of channels ($h_{tile}$, $w_{tile}$, c) to satisfy the requirements of the pixel-wise labeling phase. Image tiles may or may not be able to be directly visualized as an image since the values may be modified (e.g., be less than 0) and the packing order of the tensor can put the channels first instead of last (e.g., ($c \times h_{tile} \times w_{tile}$) instead of ($h_{tile} \times w_{tile} \times c$)).

Label tiles and the per-pixel labeling for an image are also tensors. Label tiles are tensors with a shape of ($h_{tile} \times w_{tile} \times c'$), where a tile height and a tile width match spatial dimensions of an image tile, and c' is a number of channels, one per damage type to be detected. A separate, independent channel per damage type allows for each pixel in the image tile to be labeled as belonging to more than one damage type. Similar to label tiles, label tensors for a whole image have a shape ($h \times w \times c'$), where the spatial height and width dimensions match the dimensions of the image and c' is a number of channels, one per damage type to be detected.

The system can use, for example, two types of label tensors: score label tensors and Boolean label tensors. In both the score label tensors and the Boolean label tensors, channel values indicate how much a pixel is or is not a part of an instance of the damage type corresponding to the channel. Score label tensors score each pixel as being a part of the damage type, typically as a probability. The pixel-wise labeling phase produces score label tensors. For example, score label tensors for a single damage type can be visualized by mapping probability 0.0 to black, 1.0 to white, and values in between to a gray value. Boolean label tensors encode a decision per pixel of whether the pixel is part of the damage type or not: "part-of"=true, and "not-part-of"=false. The image post-processing phase can derive Boolean label tensors from score label tensors.

It should be understood that using Boolean label tensors instead of score label tensors can be more efficient. For a first example, Boolean label tensors use less memory and are faster to manipulate since the scores in score label tensors require more memory or complex operations (e.g., floating point values). For a second example, committing to binary "part-of" and "not-part-of" labels simplify geometry extraction since different degrees of being "almost-part-of" or "almost-not-part-of" do not have to be considered and handled.

Returning to FIG. 9, in step 52, the system performs the image pre-processing phase. The image pre-processing phase transforms each selected image into image tiles. Each image tile is formatted to satisfy the requirements of one or more pixel-wise labeling models. It should be understood that operations to transform the selected images to image tiles can be different for different pixel-wise labeling models.

Figure 11:
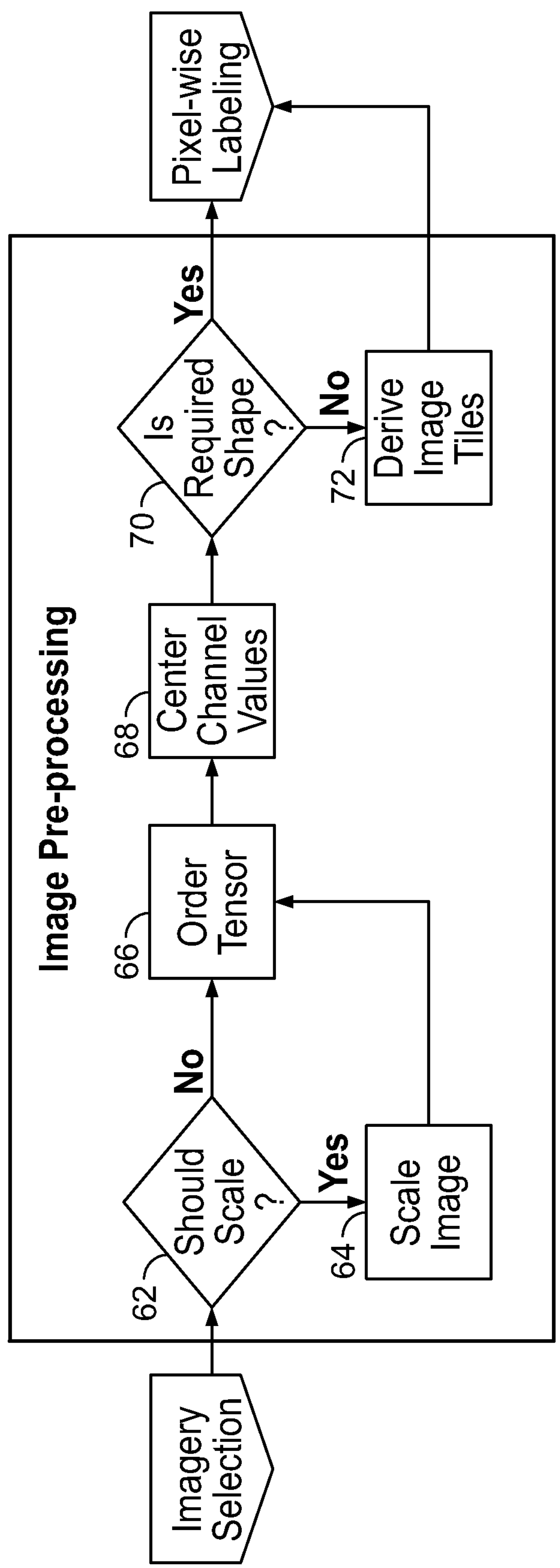
FIG. 11 is a flowchart illustrating step 52 of FIG. 9 in greater detail.

FIG. 11 is a flowchart illustrating an example flowchart of step 52 of FIG. 9 in greater detail. In step 62, the system determines whether to scale the image. Pixel-wise labeling can be more efficient and of comparable or better quality when the image is scaled down. Further, shrinking the image can lead to shorter processing times, since there are less pixels to process. This should not drastically reduce the labeling quality provided that the pixel-wise labeling models are trained on annotated images at different scales. Shrinking the image allows the model to consider wider, yet high-level, visual context around each pixel. The system can scale the image with a rescale operation which interpolates between discrete pixel values, such as bilinear or bicubic interpolation. It should be noted that scaling down by up to 80% can be ideal, but those skilled in the art would understand that scaling more than 80% would be acceptable.

It is further noted that scaling the image to multiple different sizes can aid in detecting very large ground surface damages. This is because scaling the image is similar to zooming in or out. By zooming out more (e.g., scaling down), the pixel-wise labeling model can consider a wider context around each original pixel. Zooming out can aid in determining the extents of ground surface damages which cover a wide area, such as the contour of large crack in a paved surface. By zooming in (e.g., scaling up), the pixel-wise labeling model can consider the local context around each original pixel. When the system determines to scale the image, the system proceeds to step 64, where the system scales the image. When the system determines not to scale the image, the system proceeds to step 66.

In step 66, the system performs an order tensor operation. Specifically, the system organizes a channel order of the image tensor to match the tensor format required by the pixel-wise labeling model. Image tensors can contain red, green, and blue component color channels (e.g., "RGB") and can also include depth or near infrared channels. Image processing software libraries can organize the image channels differently when images are loaded into memory. For example, a first library can order the color channels in an RGB order and a second library can order the color channels in an BGR order. Different image processing libraries can be used to train the pixel-wise labeling models and further trained to use the pixel-wise labeling models. In such a scenario, the image tensor's channels are re-ordered once loaded to match the channel order required by the pixel-wise labeling model.

The packing order of the image tensor should match the pixel-wise labeling model tensor requirements. Image tensors can have a (h×w×c) packing order, but it can be more efficient for the pixel-wise labeling model to work with tensors where the channels and spatial dimensions are transposed to (c×h×w). It should be noted that although the transformed image tensor may no longer be directly visualized as an image, it can be referred to as an image tensor since it is derived from the input image.

Figure 12:
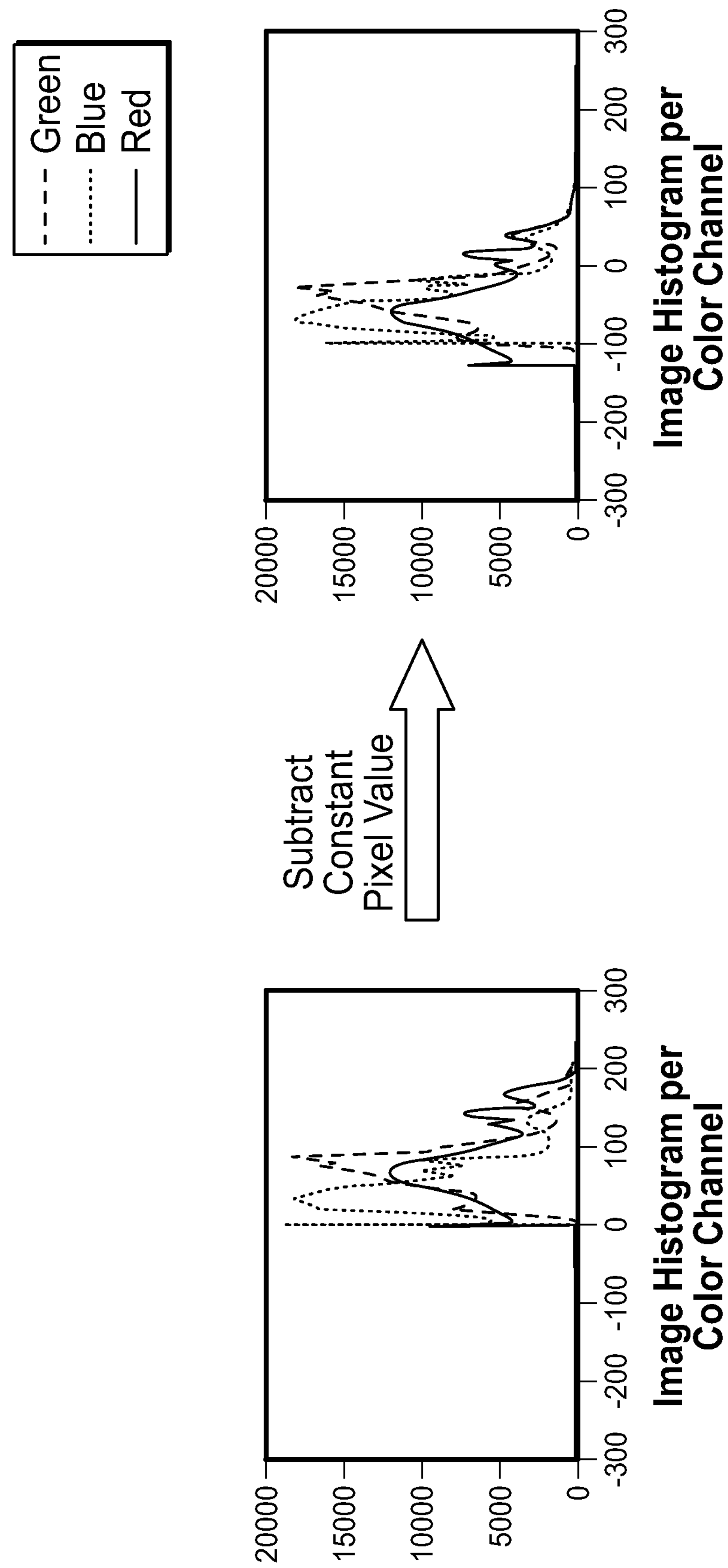
FIG. 12 is a diagram illustrating the image's RGB channels shifted by subtracting the general RGB mean values.

In step 68, the system performs an operation to center channel values. Specifically, each value for the image tensor is further modified by subtracting a constant value from each channel. The constant values for each channel are determined by calculating the arithmetic mean for the channel over a large set of images which are representative of the images to be processed. Subtracting the general mean value centers channel values on zero when applied over many images, but not necessarily for each individual image. FIG. 12 illustrates an example showing an image's RGB channels shifted by subtracting the general RGB mean values. Centering values around zero has three benefits for training and using convolutional neural networks for pixel-wise labeling. First, it is mathematically convenient. Second, it allows the network to generalize better to a variety of imagery sources. Third, it is more numerically stable since more floating-point bits can be used for precision. Those skilled in the art would understand that since the channel values are centered when the neural network is trained, they should also be centered when the neural network is applied.

In step 70, the system determines whether the image is a required shape. If the image is the required shape, the system proceeds to the pixel-wise labeling phase 54. If the image is not the required shape, the system proceeds to step 72, where the system derives image tiles. Specifically, the image tensor is expanded or sub-divided so that uniformly-shaped image tiles are generated. Using convolutional neural networks for pixel-wise labeling benefits from using uniformly-shaped input for at least two reasons. First, to avoid spending time or allocating resources to reconfigure the network for different shapes, and, second, to ensure that the network can fit and run in memory. As such, smaller-than-required image tensors are expanded and larger-than-required image tensors are sub-divided into image tiles with a uniform shape Images are expanded or sub-divided such that each original pixel is contained in one or more of the image tiles. The system performs image expansion by padding the original image with default, for example, padding pixels (e.g., zeros in every channel) to all sides of the image. Those skilled in the art would understand that other expansion methods, such as interpolation, could be used so long as labels in label post-processing can be mapped back to the original pixels. The system can perform image sub-division in a variety of ways, including, but not limited to, sliding a cropping window over the original image, or using a visual attention mechanism to identify regions of the image where ground surface damage is more likely and then taking center crops around those regions of interest plus other crops needed to cover the whole image.

When sub-dividing an image using a sliding cropping window, the amount of overlap allowed among the sub-image tiles affects both the time to produce and quality of the label tensors produced by pixel-wise labeling and label post-processing. When sliding a cropping window, the resultant sub-image tiles may overlap one another. An image might be sub-divided by sliding a cropping window from a top-left of the original image and using large overlaps, no overlaps, and small overlaps. Using large overlaps results in processing many of the pixels multiple times, which increases processing time and does not result in significant change to the final pixel labels. Using no overlap can require padding odd-shaped windows and also requires extra processing time. Furthermore, the labeling along the edges of each sub-image are less precise because of less context. As such, the system can achieve a good balance by using a small overlap such that pixels shared among sub-image tiles will be along the edge of one or more tile but more in the center of another tile. Then, the system can, when stitching label tiles in post-processing, ignore the labels along tile edges and keep the labels in tile centers. When the whole image is scaled, they system can scale to a size that will reduce the number of sub-image tiles that will be derived without significantly reducing labeling quality.

It should be understood that the operations of FIG. 11 could be reordered and still transform the selected images to image tiles. However, it should be noted that low-level data manipulations can be different.

Returning to FIG. 9, in step 54, the system performs the pixel-wise labeling phase. The pixel-wise labeling phase generates labels for each pixel in the image tile (e.g., a label tile). Pixel-wise labeling can be performed with any suitable computer vision model or algorithm, such as a fully convolutional network ("FCN"), which can predict a label for each pixel in the input image. The FCN is a neural network which is particularly suited to pixel-wise labeling since the FCN produces state-of-the-art results and automatically discovers which image features are important or unimportant to a given task. The FCN is composed of multiple layers of operations that include, but are not limited to, convolution, pooling, non-linear activation functions, "deconvolution", and unpooling. One or more of the layers of the FCN outputs a score label tensor, such as probability scores, which indicate how much each pixel belongs to each property feature.

Figure 13:
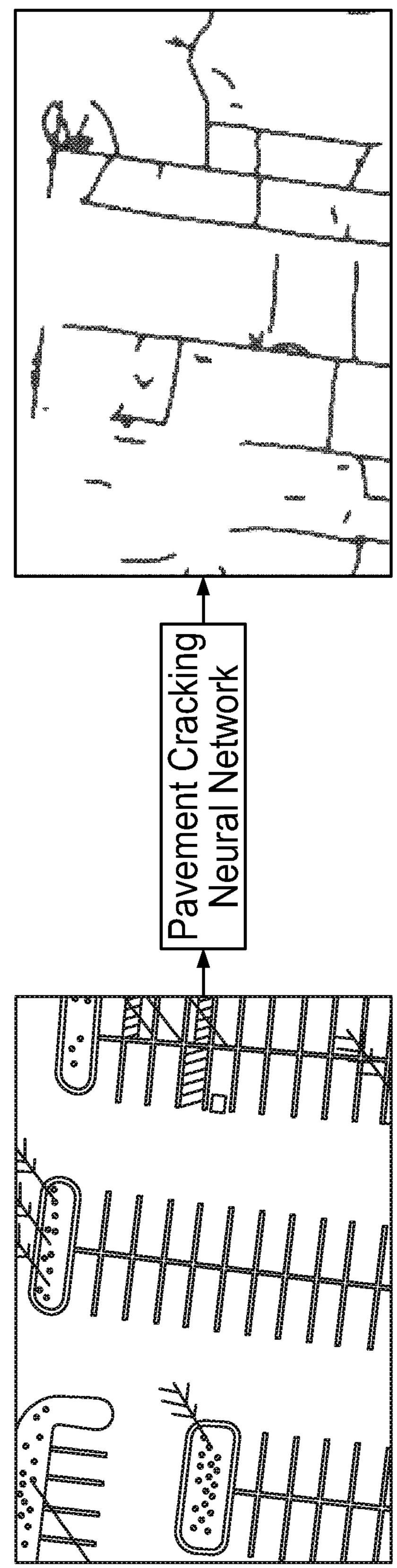
FIG. 13 is a diagram illustrating pixel-wise labeling for pavement cracking detection.

The pixel-wise labeling phase can include one or more computer vision models, and each computer vision model can label one or more property features at a time. FIG. 13 is an illustration showing an example of pixel-wise labeling for pavement cracking detection. The input image is processed by the FCN for pavement crack labeling, which produce respective score label tensors. The score label tensors are visualized by mapping probability values on [0.0, 1.0] to gray-scale pixel values on [0, 255]. Those skilled in the art would understand that the FCN can be trained to produce multiple label score tensors. For example, one for crack detection and another for utility cut depression detection.

In step 56, the system performs the label post-processing phase. Specifically, the label post-processing phase composes and transforms the scores generated during the pixel-wise labeling phase for one or more image tiles into one label tensor for the original input image.

Figure 14:
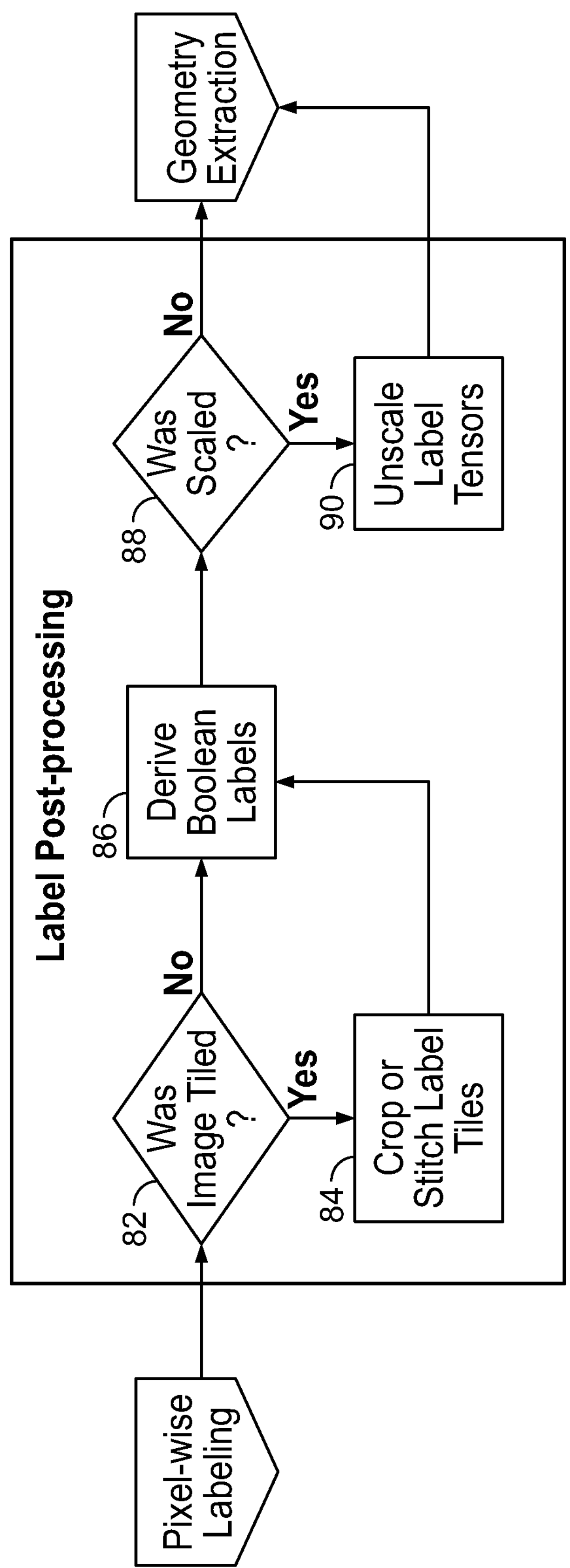
FIG. 14 is a flowchart illustrating step 56 of FIG. 9 in greater detail.

FIG. 14 is a flowchart illustrating an example flowchart of step 56 of FIG. 9 in greater detail. In step 82, the system determines if the image is tiled. When the image is tiled, the system proceeds to step 84. When the image is not tiled, the system proceeds to step 86. In step 84, the system crops or stitches the label tensors (tiles) to produce a single label tensor. Cropping a label tile to ignore padding pixels is the inverse operation to expanding an image during image pre-processing. Stitching multiple label tiles together is the inverse operation to sub-dividing an image during the image pre-processing phase. The system can use various stitching algorithms which operate pixel-by-pixel. For example, a first algorithm can average all the scores for the pixel from the various label tiles. A second algorithm can use the score from the label tile in which the pixel is most in the center of the tile. A third algorithm can use a combination of the first algorithm and the second algorithm (e.g., average the scores for the pixel from label tiles where the pixel is not close to the edge of the tile).

Figure 15:
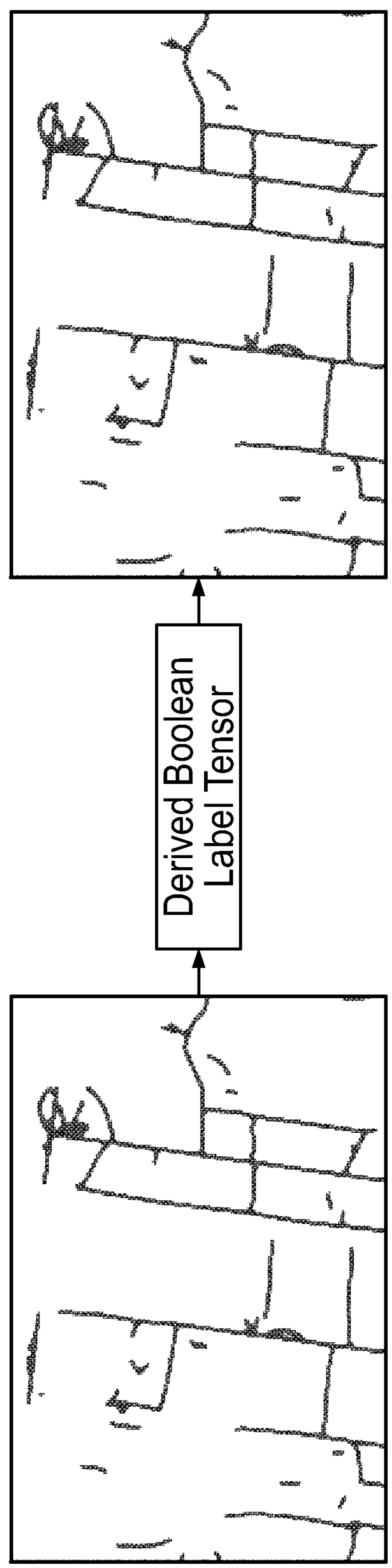
FIG. 15 is a diagram illustrating ground surface damage probabilities being converted to ground surface damage labels.

In step 86, the system derives Boolean labels. Specifically, the score label tiles are converted to Boolean label tensors using a threshold operation. It should be noted that step 86 is optional and depends on the algorithms used in the geometry extraction phase. For each ground surface damage type, the pixel is labeled as being "part-of" a damage type instance if the pixel's score is above a threshold value. Otherwise, the pixel is labeled as "not-part-of." FIG. 15 is an illustration showing how ground surface damage probabilities can be converted to ground surface damage labels using a threshold of 0.5 (or, for example, an argmax operation). Probabilities can be visualized by mapping 0.0 to black, 1.0 to white, and values in between to levels of gray. The brighter a pixel is, the more likely it is to be a part of an instance of ground surface damage. "Not-part-of" labels can be visualized as black and "part-of" labels can be visualized as white. It should be noted that the probabilities can give an imprecise or noisy representation of surface damage instance regions, whereas the "part-of" and "not-part-of" labels are crisp and distinct.

In step 88, the system determines whether the label tensors were scaled. When the label tensors were scaled, the system proceeds to step 90. When the label tensors were not scaled, the system proceeds to the geometry extraction phase 18. In step 90, the system unscales the label tensors. Specifically, the label tensor needs to be scaled to assign a label to each pixel in the whole input image if it had been scaled during image pre-processing phase. To unscale the label tensor, it is scaled in reverse to the image scaling that was performed in the pre-processing phase. If the image was shrunk, then the labels are expanded, and if the image was expanded then the labels are shrunk. Scaling the score label tensor can be performed by interpolating the score values, similar to how the image is scaled by interpolating pixel values, or can be performed with a nearest neighbor approach. Scaling a Boolean label tensor can be performed using a nearest neighbor approach, instead of interpolation, so that the labels remain as binary "part-of" and "not-part-of" values.

When the image is processed at multiple scales, then in the label post-processing phase 56, an ensemble of label tensors are combined into a single label tensor. The combination can be done in a variety of ways, including, but not limited to, applying a bit-wise or operation to Boolean label tensors, or performing a weighted combination of score label tensors, such as with a linear combination or with a soft-max function.

Figure 16:
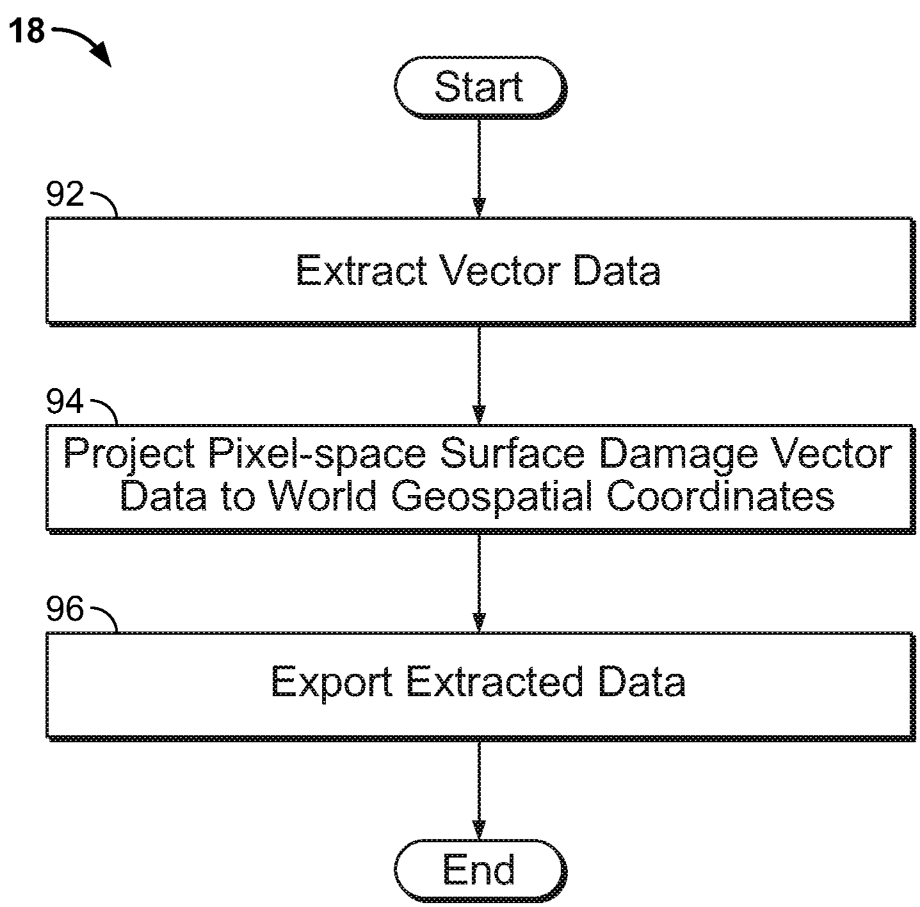
FIG. 16 is a flowchart illustrating step 18 of FIG. 1 in greater detail.

FIG. 16 shows a flowchart illustrating step 18 of FIG. 1 in greater detail. In particular, FIG. 16 illustrates process steps performed during the geometric extraction. The geometry extraction extracts and exports 2D geospatial representations of ground surface damage regions from the label tensor for the input image. In step 92, the system extracts vector data. The vector data represents the surface damage in pixel space. Surface damage representations can include, but are not limited to, polygons, line segments, points, or bounding boxes. Surface damage representations in pixel-space are extracted using an appropriate contour extraction, bounding box finding, or other similar algorithm. It should be noted that prior to extracting the vector data, the noise, or small holes, for each surface damage type in the label tensor are filled-in or closed using morphological image transformations. To extract contour outlines of the property feature, the system uses a contour extraction algorithm which looks at the "part-of" and "not-part-of" labels to find the region bounds for each surface damage type. The outputs of the contour extraction algorithm are closed polygons in pixel space.

Figure 17:
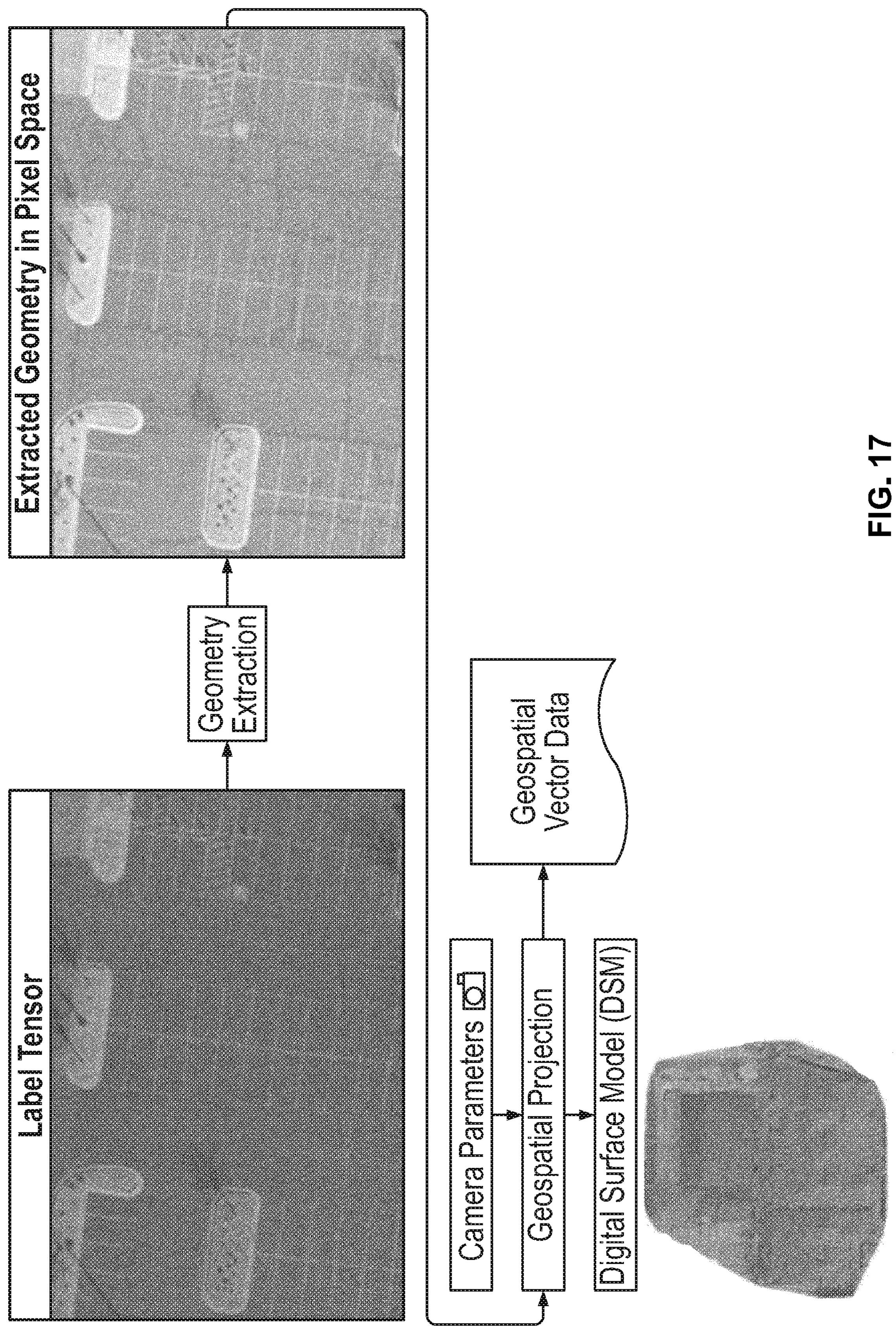
FIG. 17 is a diagram illustrating contour extraction and simplification for ground surface cracking detection.

The extracted polygons can be further simplified, or smoothed, in their representation by using a fewer number of points to represent each one. An example of the contour extraction algorithm is a Douglas-Peucker algorithm. Further, a bounding box can be extracted instead by taking the bounds around extracted contours. FIG. 17 is an illustration showing an example of contour extraction and simplification for ground surface cracking detection. Ground surface crack contours are first extracted from the Boolean label tensor, and then are further simplified by reducing the number of line segments used to represent the polygon.

For some types of damage, it may be desirable to approximate the extracted representation with a simpler or standard parametric shape. For example, pot holes in a ground surface may be well approximated with a rectangle or an ellipse. The different processing nodes for geometry extraction may thus be configured to use different approximations for the extracted contours. A simpler shape could be obtained by calculating the convex hull of the polygon instead of the actual polygon, although using the convex hull would increase the area of concave polygons. If sufficiently rectangular, the convex hull could be simplified to a rectangle. The system can approximating a region with an ellipse or a circle via an algorithm known to those skilled in the art.

In step 94, the system projects the pixel-space surface damage vector data to world geospatial coordinates using the image metadata and the elevation of a surface in the region of interest, such as, for example, the ground elevation from a digital surface model. Surface elevations, such as the elevation of the ground above sea level, can be obtained from digital surface models ("DSMs") or digital elevation models ("DEMs"). The elevation can be retrieved by calculating the center of the region of interest provided as input to the system, and then querying the DSM for the elevation of the ground at that latitude and longitude. The intrinsic camera parameters are used to transform pixel-space coordinates to camera coordinates, which adjust for geometric distortion introduced by camera optics. Camera-space coordinates are transformed to world coordinates using the camera extrinsic parameters, which identify the geolocation of the camera, and the known surface elevation. For each point in camera-space, a ray is projected from the point, parallel to the camera's optical axis, until it intersects with a known surface. The intersection point is the geospatial location for the original pixel-space point. The transformation is applied to each pixel-space coordinate of the surface damage vector data to produce a geospatial vector data representation for the surface damage.

In step 96, the system exports the extracted data. In a first example, exporting can include returning the geospatial vector data to the user. In a second example, exporting can include the vector data being persisted to a geospatial data store such the data can later be retrieved and utilized. By exporting the data, the damage detected can be used to generate a detailed damage report for the input region of interest.

Figure 18:
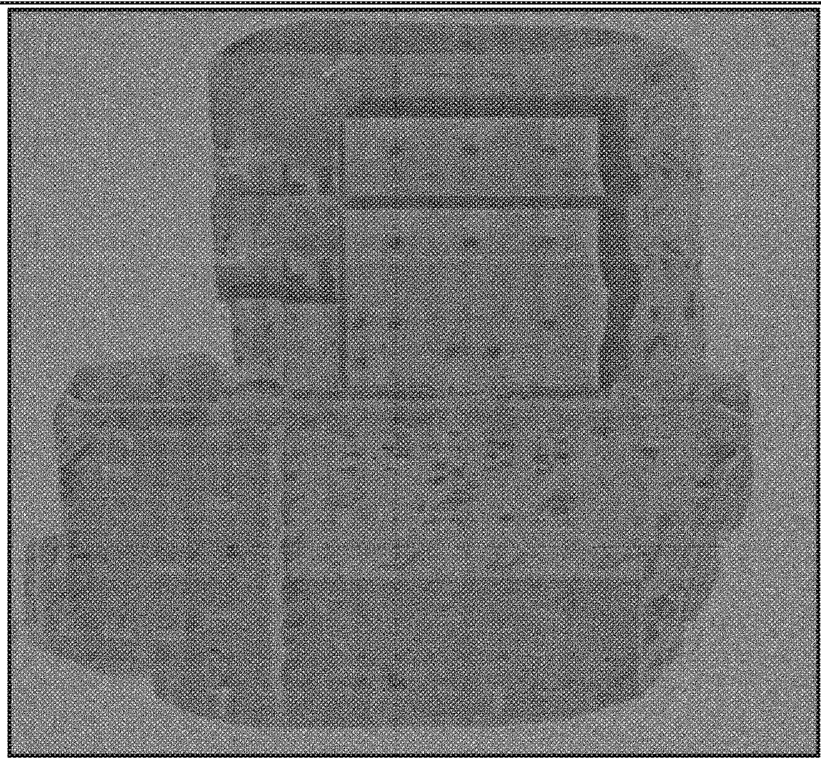
FIG. 18 is a diagram illustrating a sample report generated to display and summarize the damages found in the region of interest.

Returning to FIG. 1, in step 20, the system generates the damage report. Specifically, the damage report is generated from the detected ground surface damages. The report can include, but is not limited to, square feet of damage caused by cracking, square feet of damage pot holes, square feet of damage by utility cuts, and percentage of region of interest affected by damage. The report can also include summary image representation of the described damages. FIG. 18 is an illustration showing a sample report generated to display and summarize the damages found in the region of interest.

Figure 19:
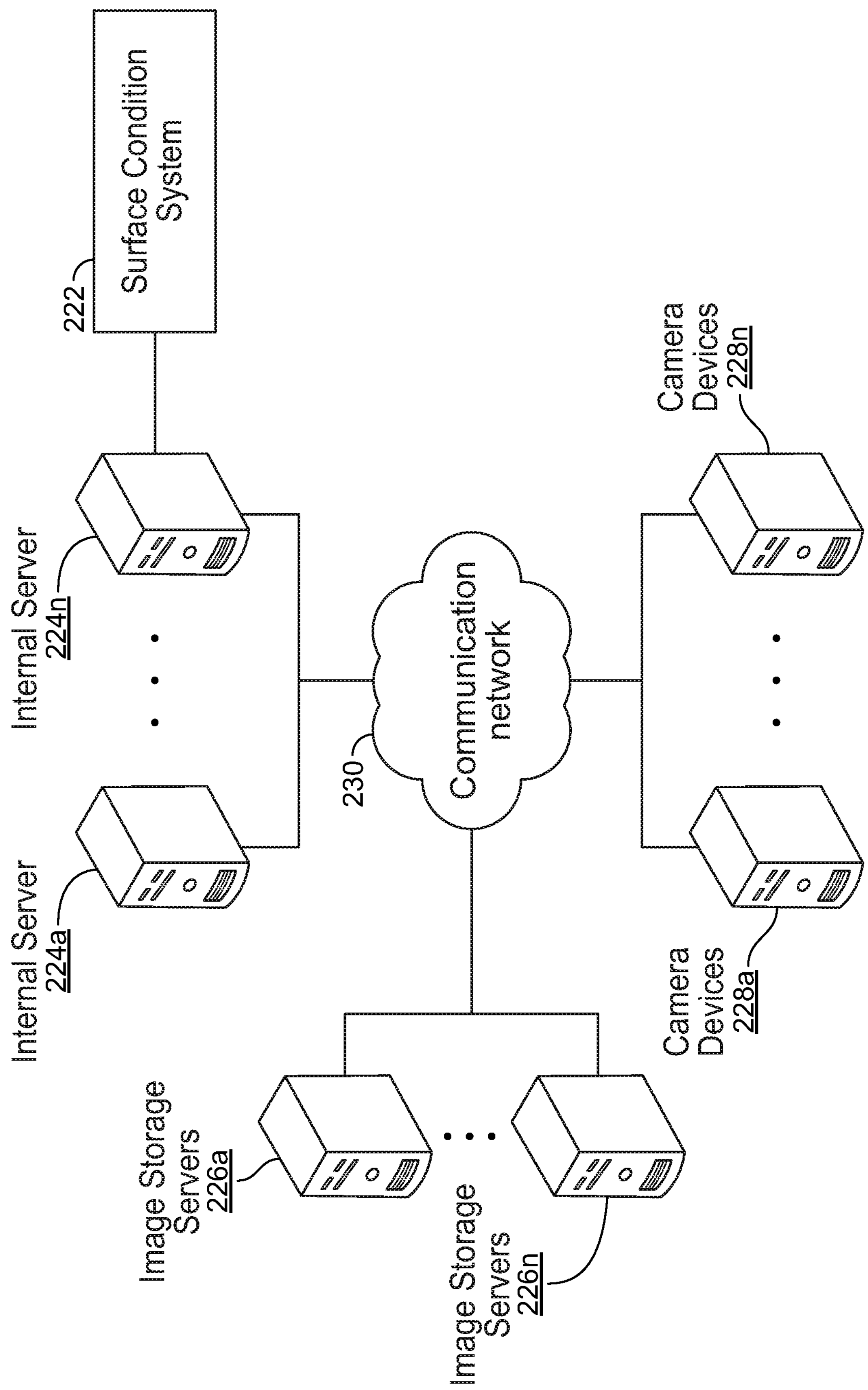
FIG. 19 is a diagram illustrating sample hardware components on which the system of the present disclosure could be implemented.

FIG. 19 is a diagram illustrating computer hardware and network components on which the system of the present disclosure could be implemented. The system can include a plurality of internal servers 224*a*-224*n* having at least one processor and memory for executing the computer instructions and methods described above (which could be embodied as computer software 222 illustrated in the diagram). The system can also include a plurality of image storage servers 226*a*-226*n* for receiving the image data and video data. The system can also include a plurality of camera devices 228*a*-228*n* for capturing image data and video data. These systems can communicate over a communication network 230. The surface condition system 222 or engine can be stored on the internal servers 224*a*-224*n* or on an external server(s). Of course, the system of the present disclosure need not be implemented on multiple devices, and indeed, the system could be implemented on a single computer system (e.g., a personal computer, server, mobile computer, smart phone, etc.) without departing from the spirit or scope of the present disclosure.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure.

What is claimed:

1. A system for detecting and extracting a ground surface condition from an image comprising:

a memory; and a processor in communication with the memory, the processor:

performing a high resolution scan of at least one input image;

generating an orthomosaic model and a digital surface model based on the high resolution scan of the at least one input image;

generating an image tile based on the generated orthomosaic model and the digital surface model;

determining a label for each pixel of the image tile, via a computer vision model, the label indicating a probability of a presence of a ground surface condition;

generating a label tensor for the at least one input image based on each label for each pixel of the generated image tiie;

extracting a two-dimensional geospatial representation of a detected ground surface condition based on the generated label tensor for the at least one input image; and generating a report indicative of damage associated with the detected ground surface condition based on the extracted two-dimensional geospatial representation.

2. The system of claim 1, wherein the processor:

receives a geospatial region of interest, the geospatial region of interest being a polygonal boundary indicative of latitudinal and longitudinal coordinates of a region; and retrieves the at least one input image and the metadata of the at least one input image from the memory based on the received geospatial region of interest.

3. The system of claim 1, wherein the processor:

receives a geospatial region of interest, the geospatial region of interest being a polygonal boundary indicative of latitudinal and longitudinal coordinates of a region; and captures the at least one input image at a sub-inch ground sample distance based on the received geospatial region of interest.

4. The system of claim 1, wherein the at least one input image is an aerial image, a satellite image, a ground-based image, a photograph and a scan.

5. The system of claim 1, wherein the processor:

performs a high resolution scan of a plurality of images, the plurality of images being captured by a plurality of image capturing sources;

determines a spatial position and an orientation of each image capturing source among the plurality of image capturing sources relative to one another by selecting a matching key point in a determined image pair among the plurality of images;

determines at least one extrinsic parameter of the plurality of image capturing sources based on a transformation of the selected matching key point from one image of the determined image pair to another image of the determined image pair;

generates the orthomosaic model based on the determined at least one extrinsic parameter of the plurality of image capturing sources by stitching the plurality of images together to form a first image; and generates the digital surface model by stitching the plurality of images together to form a second image.

6. The system of claim 1, wherein the ground surface includes a parking lot, a roadway, and a driveway.

7. The system of claim 1, wherein:

the generated image tile is an image tile tensor having a first shape including a first height, a first width and a first number of channels, and the determined label is a score label tensor having a second shape including a second height and a second width corresponding to the first height and the first width of the image tile tensor and a second number of channels, the score label tensor being indicative of a probability of a presence of at least one type of ground surface condition including cracking, distortion, disintegration, polished aggregate, bleeding, flushing and utility cut depression.

8. The system of claim 7, wherein the label is a Boolean tensor label, the Boolean tensor label being derived from the score label tensor and being indicative of one of an absence of a ground surface condition and the detection of the at least one type of ground surface condition based on a predetermined threshold.

9. The system of claim 1, wherein the computer vision model is a fully convolutional network.

10. The system of claim 1, wherein the processor generates the label tensor for the at least one input image based on each determined label for each pixel of the generated image tile by performing one of a cropping operation and a stitching operation on the determined labels.

11. The system of claim 1, wherein the two-dimensional geospatial representation includes a polygon, a line segment, a point and a bounding box.

12. The system of claim 1, wherein the processor extracts the two-dimensional geospatial representation of the detected ground surface condition based on the generated label tensor for the at least one input image by:

extracting vector data indicative of the detected ground surface condition in pixel space via one of a contour extraction algorithm and a bounding box finding algorithm;

projecting the extracted vector data to world geospatial coordinates using metadata of the at least one input image and a ground elevation of the generated digital surface model; and exporting the projected extracted vector data.

13. A method for detecting and extracting a ground surface condition from an image comprising the steps of:

performing a high resolution scan of at least one input image;

generating an orthomosaic model and a digital surface model based on the performed high resolution scan of the at least one input image;

generating an image tile based on the generated orthomosaic model and the digital surface model;

determining a label for each pixel of the generated image tile via a computer vision model, the label being indicative of a probability of a presence of a ground surface condition;

generating a label tensor for the at least one input image based on each determined label for each pixel of the generated image tile;

extracting a two-dimensional geospatial representation of a detected ground surface condition based on the generated label tensor for the at least one input image; and generating a report indicative of damage associated with the detected ground surface condition based on the two-dimensional geospatial representation.

14. The method of claim 13, further comprising:

receiving a geospatial region of interest, the geospatial region of interest being a polygonal boundary indicative of latitudinal and longitudinal coordinates of a region; and retrieving the at least one input image and the metadata of the at least one input image from a memory based on the received geospatial region of interest.

15. The method of claim 13, further comprising:

receiving a geospatial region of interest, the geospatial region of interest being a polygonal boundary indicative of latitudinal and longitudinal coordinates of a region; and capturing the at least one input image at a sub-inch ground sample distance based on the received geospatial region of interest.

16. The method of claim 13, further comprising:

performing a high resolution scan of a plurality of images, the plurality of images being captured by a plurality of image capturing sources;

determining a spatial position and an orientation of each image capturing source among the plurality of image capturing sources relative to one another by selecting a matching key point in a determined image pair among the plurality of images;

determining at least one extrinsic parameter of the plurality of image capturing sources based on a transformation of the selected matching key point from one image of the determined image pair to another image of the determined image pair;

generating the orthomosaic model based on the determined at least one extrinsic parameter of the plurality of image capturing sources by stitching the plurality of images together to form a first image; and generating the digital surface model by stitching the plurality of images together to form a second image.

17. The method of claim 13, further comprising:

generating the label tensor for the at least one input image based on each determined label for each pixel of the generated image tile by performing one of a cropping operation and a stitching operation on the determined labels.

18. The method of claim 13, wherein the step of extracting the two-dimensional geospatial representation of the detected ground surface condition based on the generated label tensor for the at least one input image comprises the steps of:

extracting vector data indicative of the detected ground surface condition in pixel space via one of a contour extraction algorithm and a bounding box finding algorithm;

projecting the extracted vector data to world geospatial coordinates using metadata of the at least one input image and a ground elevation of the generated digital surface model; and exporting the projected extracted vector data.

* * * * *

UNITED STATES PATENT AND TRADEMARK OFFICE

CERTIFICATE OF CORRECTION

PATENT NO. : 10,803,613 B2
APPLICATION NO. : 16/582565
DATED : October 13, 2020
INVENTOR(S) : Porter et al.

It is certified that error appears in the above-identified patent and that said Letters Patent is hereby corrected as shown below:

In the Claims

In Column 12, Line 9, the word "tiie" should be deleted and replaced with the word "tile"

Signed and Sealed this
Twenty-seventh Day of September, 2022

Katherine Kelly Vidal

Katherine Kelly Vidal
*Director of the United States Patent and Trademark Office*